(12) United States Patent
Drewes et al.

(10) Patent No.: US 10,247,631 B2
(45) Date of Patent: Apr. 2, 2019

(54) DIFFERENTIAL PRESSURE MEASURING CELL

(71) Applicant: Endress + Hauser GmbH + Co. KG, Maulburg (DE)

(72) Inventors: Ulfert Drewes, Mullheim (DE); Michael Hugel, Lorrach (DE); Nils Ponath, Lorrach (DE); Andreas Rossberg, Bad Sackingen (DE); Elke Schmidt, Bad Sackingen (DE); Thomas Uehlin, Schopfheim (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 160 days.

(21) Appl. No.: 15/323,481

(22) PCT Filed: Jun. 8, 2015

(86) PCT No.: PCT/EP2015/062699
§ 371 (c)(1),
(2) Date: Jan. 3, 2017

(87) PCT Pub. No.: WO2016/005120
PCT Pub. Date: Jan. 14, 2016

(65) Prior Publication Data
US 2017/0146418 A1      May 25, 2017

(30) Foreign Application Priority Data

Jul. 8, 2014   (DE) .................. 10 2014 109 491

(51) Int. Cl.
*G01L 13/02* (2006.01)
*G01L 15/00* (2006.01)
*G01L 19/06* (2006.01)

(52) U.S. Cl.
CPC ........ *G01L 19/0618* (2013.01); *G01L 13/025* (2013.01); *G01L 15/00* (2013.01)

(58) Field of Classification Search
CPC ....... G01L 13/02; G01L 13/025; G01L 15/00; G01L 19/00; G01L 19/06; G01L 19/0618; G01L 19/14
See application file for complete search history.

(56) References Cited

U.S. PATENT DOCUMENTS 3,400,588 A * 9/1968 O'Connor ............... G01F 7/005
73/716
4,072,058 A   2/1978 Whitehead, Jr.
(Continued)

FOREIGN PATENT DOCUMENTS

CN          1938572 A        3/2007
DE    102004017580 A1       12/2005
(Continued)

OTHER PUBLICATIONS

German Search Report, German Patent Office, Munich, DE, dated Sep. 22, 2014.
(Continued)

*Primary Examiner* — Nguyen Q. Ha
(74) *Attorney, Agent, or Firm* — Bacon & Thomas, PLLC

(57) ABSTRACT

A differential pressure measuring cell comprises a measuring membrane; two opposing bodies; and one converter. The measuring membrane is arranged between the opposing bodies and is connected in a pressure-tight manner to the two opposing bodies, forming in each case one measuring chamber. The opposing bodies each have a pressure duct through which a pressure can be made to act upon the respective measuring chamber. The converter is provided in order to convert a deformation of the measuring membrane, which deformation is dependent upon a difference between the pressures, into an electrical signal; wherein the opposing
(Continued)

bodies each have a chamber section oriented toward the measuring membrane and a rear wall section oriented away from the measuring membrane with, between these, a decoupling chamber. The chamber sections each have an equalizing duct between the measuring chamber and the decoupling chamber, wherein the decoupling chamber has a diameter that is at least as large as the diameter of the measuring chamber.

13 Claims, 2 Drawing Sheets

(56) References Cited

U.S. PATENT DOCUMENTS

| | | |
|---|---|---|
| 2002/0014124 A1 | 2/2002 | Drewes et al. |
| 2011/0296926 A1 | 12/2011 | Schulte et al. |
| 2014/0157905 A1 | 6/2014 | Tokuda et al. |

FOREIGN PATENT DOCUMENTS

| | | |
|---|---|---|
| DE | 112004002995 B4 | 12/2010 |
| DE | 102010043043 A1 | 5/2012 |
| DE | 102014109491 A1 | 2/2016 |
| EP | 0723143 A1 | 7/1996 |
| JP | S5740626 A | 3/1982 |

OTHER PUBLICATIONS

International Search Report, EPO, The Netherlands, dated Aug. 20, 2015.
English Translation of the International Preliminary Report on Patentability, WIPO, Geneva, CH, dated Jan. 19, 2017.
Chinese Office Action corresponding to Chinese Application No. 201580035473.8, dated Aug. 9, 2018.

\* cited by examiner

DIFFERENTIAL PRESSURE MEASURING CELL

TECHNICAL FIELD

The present invention relates to a differential pressure measuring cell, especially a differential pressure measuring cell with protection against static overloads.

BACKGROUND DISCUSSION

Differential pressure measuring cells are generally optimized for measuring small pressure differences $p_1-p_2$ at high static pressures $p_1$, $p_2$. In doing so, it is important to find the right balance between sensitivity and overload resistance. For example, for the measurement range of the pressure difference $|p_1-p_2|$, $|p_1-p_2|/p_1<1\%$ may apply. If one of the pressures $p_1$, $p_2$ in a process unit is omitted, the differential pressure sensor is loaded with 100 times the measurement range. Differential pressure sensing elements are known that withstand such overloads. A proven protection of the sensitive differential pressure measuring cells is based upon connecting an overload membrane hydraulically in parallel to the differential pressure sensor and applying the two pressures $p_1$, $p_2$ to the differential pressure measuring cell and the overload membrane via hydraulic paths, wherein the pressures are introduced into the hydraulic paths via separation membranes. An overload membrane has a sufficiently large hydraulic capacity in order to, in case of a unilateral overload, accommodate the volume of a transfer fluid in a hydraulic path to such an extent that the separation membrane of this hydraulic path comes to abut against a membrane bed, so that another increase of the differential pressure acting on the differential pressure sensor is reliably prevented. Examples of differential pressure sensing elements with overload membranes are disclosed in European Patent, EP 1 299 701 B1, and German Patents, DE 10 2006 040 325 A1, and DE 10 2006 057 828 A1.

The use of overload membranes does, however, necessarily lead to larger volume strokes of the transfer fluid and thus, with the same performance capacity, to larger separation membrane surfaces, which results in larger device dimensions and higher costs. In addition, the measuring element dynamics are negatively affected by the overload membrane and the larger volume of the transfer fluid.

Efforts are therefore known for realizing the overload protection for the measuring membrane by means of membrane beds. In doing so, the measuring membrane is to be supported, in case a limit value for a unilateral overpressure is exceeded, by the membrane bed to such a degree that the bursting stress of the measuring membrane is not reached, even in case of another pressure increase.

For this purpose, aspherical membrane beds that approximate the bending line of the measuring membrane at the limit value for the overpressure are especially suitable.

The patent specification U.S. Pat. No. 4,458,537 discloses a capacitive differential pressure measuring cell with an aspherical membrane bed made of glass, which membrane bed is introduced into a structure of coaxial rings, wherein the heights of the rings form a contour that corresponds to the bending line of the measuring membrane.

The published German patent application, DE 10 2009 046 229 A1 discloses a pressure sensor or a differential pressure measuring cell with an aspherical membrane bed made of glass, which membrane bed is formed by thermal sinking.

The patent specification U.S. Pat. No. 7,360,431 B2 discloses a pressure sensor or a differential pressure sensor with an aspherical membrane bed that is prepared in silicon by means of gray scale lithography.

The published German patent application, DE 10 2010 028 773 A1 discloses a pressure sensor or a differential pressure measuring cell with an aspherical membrane bed that is prepared in silicon by means of laser ablation, followed by an oxidation step and a final etching step.

Even though the membrane bed concepts mentioned can, in fact, protect the measuring membrane to a certain degree, the static pressure introduced into the differential pressure measuring cell nonetheless loads the joints between the measuring membrane and the opposing bodies or adjacent regions, so that stress peaks can occur there that result in a destruction of the differential pressure sensor.

The International patent publication, WO 2011/076477 A1 discloses a differential pressure measuring cell, in which the volume stroke of the measuring membrane is sufficient to accommodate the volume of the transfer fluid in case of an overload beneath a separation membrane, without plastic deformation of the measuring membrane.

The still unpublished German patent application, DE 102012113033 discloses a differential pressure sensor with a differential pressure measuring cell that comprises a measuring membrane and opposing bodies made of silicon, wherein the opposing bodies are respectively reinforced on the rear side by a ceramic body in order to avoid or reduce bending of the opposing bodies under static pressures. In this way, the notch stresses on the joints, especially, between the measuring membrane and the opposing bodies are to be reduced.

To the extent that notch stresses occur, especially in cavities having acute angles, approaches are known for avoiding such acute angles between components, which form a chamber, into which a high static pressure is introduced. In this respect, reference is made, for example, to U.S. Pat. No. 5,520,054, which discloses a pressure sensor, the pressure chamber of which has exclusively obtuse angles in its cross-section.

Aside from static overload pressures being present on both sides, a unilateral loading of the differential pressure measuring cell with a static overload pressure can also damage or destroy the measuring membrane, the opposing bodies, or the joints between the measuring membrane and the opposing bodies or adjacent regions, if the unilateral overload results in deformations of the opposing bodies, whereby the supporting function of the membrane beds is impaired, for example.

In order to counteract this, Hein et al. (Transducers '97, pp. 1477-1480, 1997) discloses an encapsulated capacitive differential pressure sensor, in which the opposing bodies are axially clamped between pressure connection pieces, wherein a sealing ring is respectively additionally clamped between an opposing body and a pressure connection piece. The German patent, DE 37 51 546 T2 also discloses a differential pressure sensor that has a measuring membrane between two opposing bodies, wherein the two opposing bodies are axially clamped in an elastic clamping device, in order to increase the bursting strength of the differential pressure sensor. The two arrangements described above have in common that relative movements between the opposing bodies and the clamping device can occur when the differential pressure sensor is loaded with static pressure. This can especially result in hysteresis errors in the zero point and the range of a differential pressure-dependent measurement signal of the differential pressure sensor. The still unpublished German application, DE 102014104831 solves this problem by describing a differential pressure sensor with a clamping device that prevents relative movements between the opposing bodies and the clamping device. These constructions, however, impose high requirements on the component tolerances and are expensive in this respect.

Approaches for hydraulically supporting the differential pressure measuring cell are also known from the prior art. For this purpose, the German published patent application, DE 101 01 180 A1, for example, discloses a differential pressure sensor with an encapsulated differential pressure measuring cell, wherein the differential pressure measuring cell is surrounded in the capsule by a transfer fluid that is kept under pressure by means of a pressure reservoir.

U.S. Pat. Nos. 4,257,274 and 5,684,253 respectively disclose a differential pressure sensor with an isostatically encapsulated differential pressure measuring cell, wherein one of the static pressures that is included in the differential pressure measurement is respectively introduced into a capsule surrounding the differential pressure measuring cell. This concept has a comparatively simple design, but fails when the static overload pressure is the other pressure, i.e., precisely not the pressure that is introduced into the capsule. U.S. Pat. No. 7,624,642 takes this problem into account by the higher of the two process pressures respectively defining the pressure surrounding the differential pressure measuring cell in a capsule, which is achieved via "hydraulic diodes." However, implementing these is very complex, because additional separation membranes are required for the "hydraulic diodes."

The above overview of the prior art shows a variety of approaches for making differential pressure sensors suitable for high static pressures, wherein it becomes apparent that none of the solutions mentioned is suitable for all applications, whether for reasons of cost or due to structural or thermomechanical boundary conditions.

SUMMARY OF THE INVENTION

The present invention is based upon the aim of providing an in-itself overload-proof differential pressure measuring cell.

The aim is achieved by the differential pressure measuring cell according to the present invention.

The differential pressure measuring cell according to the invention comprises:

a measuring membrane, a first opposing body, a second opposing body, and a converter, wherein the measuring membrane is arranged between the first opposing body and the second opposing body and is connected in a pressure-tight manner to the two opposing bodies, wherein a first measuring chamber is formed between the measuring membrane and the first opposing body, and a second measuring chamber is formed between the measuring membrane and the second opposing body, wherein the first opposing body and the second opposing body each have a pressure duct through which a first or a second pressure ($p_1$, $p_2$) can be applied to the respective measuring chamber, wherein the converter is provided in order to convert a deformation of the measuring membrane, which deformation is dependent upon a difference between the first pressure ($p_1$) and the second pressure ($p_2$), into an electrical signal;

wherein at least one opposing body has a chamber section oriented toward the measuring membrane and a rear wall section oriented away from the measuring membrane and a decoupling chamber between the chamber section and the rear wall section, wherein the chamber section has at least one equalizing duct by means of which the measuring chamber communicates with the decoupling chamber, wherein the decoupling chamber has, in a plane parallel to the measuring membrane, a diameter that is larger than the diameter of the equalizing duct.

In a further development of the invention, the decoupling chamber has, in a plane parallel to the measuring membrane, a diameter that is at least as large as the diameter of the measuring chamber.

In a further development of the invention, a surface of the chamber section has an annular circumferential relief groove, the surface being oriented toward the decoupling chamber.

In a further development of the invention, a surface of the rear wall section has an annular circumferential relief groove, the surface being oriented toward the decoupling chamber.

The relief grooves especially offer the advantage that they reduce the notch stresses between the rear wall section and the chamber section at the outer radius of the decoupling chamber. This can basically also be achieved by the decoupling chamber having a sufficient axial height, such as 100 µm or more. This would, however, significantly increase the volume enclosed by the differential pressure measuring cell, which is to be avoided, because in most applications of industrial process measurement technology, the process pressures to be detected are applied to the differential pressure measuring cells via a transfer fluid, wherein the transfer fluid is separated from the process medium via a separation membrane. Since the separation membrane must accommodate the volume stroke of the transfer fluid, which volume stroke is especially caused by temperature fluctuations and which volume stroke is proportional to the volume of the transfer fluid, this volume must be minimized. For this reason, the relief grooves in the front sides of the rear wall sections and the chamber sections are to be preferred over an increase of the axial height of the decoupling chamber.

In a further development of the invention, the differential pressure measuring cell has at least one filling body that is especially annular and largely fills the volume of the relief groove or relief grooves. The filling body preferably has a thermal expansion coefficient that is compatible with the thermal expansion coefficient of the material of the chamber section and/or the rear wall section, and especially differs from the latter by less than 1 ppm/K. This can obviously be achieved by the filling body having the same material as the chamber section and/or the rear wall section. It is, however, with a rear wall section and/or a chamber section made of corundum, more cost-effective to use a filling body made of Kovar.

In a further development of the invention, the volume stroke of the decoupling chamber $\Delta V_E = V_E(p_{stat}) - V_E(p_0)$, in case of a loading of the first measuring chamber and the second measuring chamber with the same static pressure $p_{stat}$, is at least as large as the volume stroke of the measuring chamber communicating with the decoupling chamber via the equalizing duct $\Delta V_M = V_M(p_{stat}) - V_M(p_0)$, where $p_0$ is an equilibrium pressure, in case of which the same pressure prevails inside and outside the differential pressure measuring cell.

In a further development of the invention, the volume stroke of the decoupling chamber $\Delta V_E$ is at least double, and especially not less than four times, the volume stroke of the measuring chamber communicating with the decoupling chamber via the equalizing duct $\Delta V_M$.

In a further development of the invention, at least one of the chamber sections has a membrane bed oriented toward the measuring membrane, which membrane bed supports the measuring membrane in case of a unilateral overload pressure.

In a further development of the invention, the membrane bed has a contour that approximates a bending line of the measuring membrane at a unilateral limit pressure, so that the measuring membrane is supported by the membrane bed when this limit pressure is reached.

In a further development of the invention, the chamber section and the rear wall section are connected to one another in a pressure-tight manner by means of a circumferential opposing body joint, wherein the maximum stresses in the opposing body joint are less than the maximum stresses in the rear wall section when pressure is applied to the differential pressure measuring cell.

In a further development of the invention, the maximum stress in the rear wall section is adjacent to the relief groove, wherein the relief groove has a depth of not less than 0.1 mm, and especially not less than 0.2 mm, and wherein the location of the maximum stress in the rear wall section is spaced apart from the joint at least by half the depth of the relief groove, preferably by at least the depth of the relief groove.

In a further development of the invention, the measuring membrane is respectively connected to the opposing bodies along a circumferential membrane joint, wherein the maximum stress in the membrane joint is smaller than the maximum stress in the opposing body joint when the same static pressure $p_{stat}$ is applied to the first measuring chamber and the second measuring chamber.

In a further development of the invention, the membrane bed has at its outer edge an annular circumferential membrane bed groove that extends up to the membrane joint. On the one hand, the membrane bed groove is used to reduce notch stresses in the membrane joint, and, on the other hand, it can prevent the active hard solder from entering the membrane bed in the case of membrane joints that are prepared using an active hard solder. Naturally, such a membrane bed groove is, preferably, to be respectively provided in both membrane beds, and the membrane bed grooves are to be designed to be symmetrical.

In a further development of the invention, the measuring membrane and/or the chamber section and/or the rear wall section feature a ceramic material, especially corundum. Even though this pervasive use of corundum is currently preferred, other materials, such as ceramic materials, metals, and semiconductors, as well as material combinations, such as of metal and ceramic materials, are also included in the invention.

In a further development of the invention, the joints comprise an active hard solder, such as a Zr—Ni—Ti-containing active hard solder.

In a further development of the invention, the differential pressure measuring cell has at least one additional electric converter for determining a static pressure, which is applied to the differential pressure measuring cell, at least based upon a pressure-dependent deformation of a rear wall section.

In a further development of the invention, the additional electric converter comprises a capacitive converter that comprises a first electrode on an end surface of the rear wall section, which end surface is oriented toward the decoupling chamber, and a second electrode on an end surface of the chamber section, which end surface is oriented toward the decoupling chamber.

BRIEF DESCRIPTION OF THE DRAWINGS

The invention is now explained on the basis of the exemplary embodiment of a differential pressure measuring cell shown in the drawing. The figures show.

DETAILED DISCUSSION IN CONJUNCTION WITH THE DRAWINGS

Figure 1:
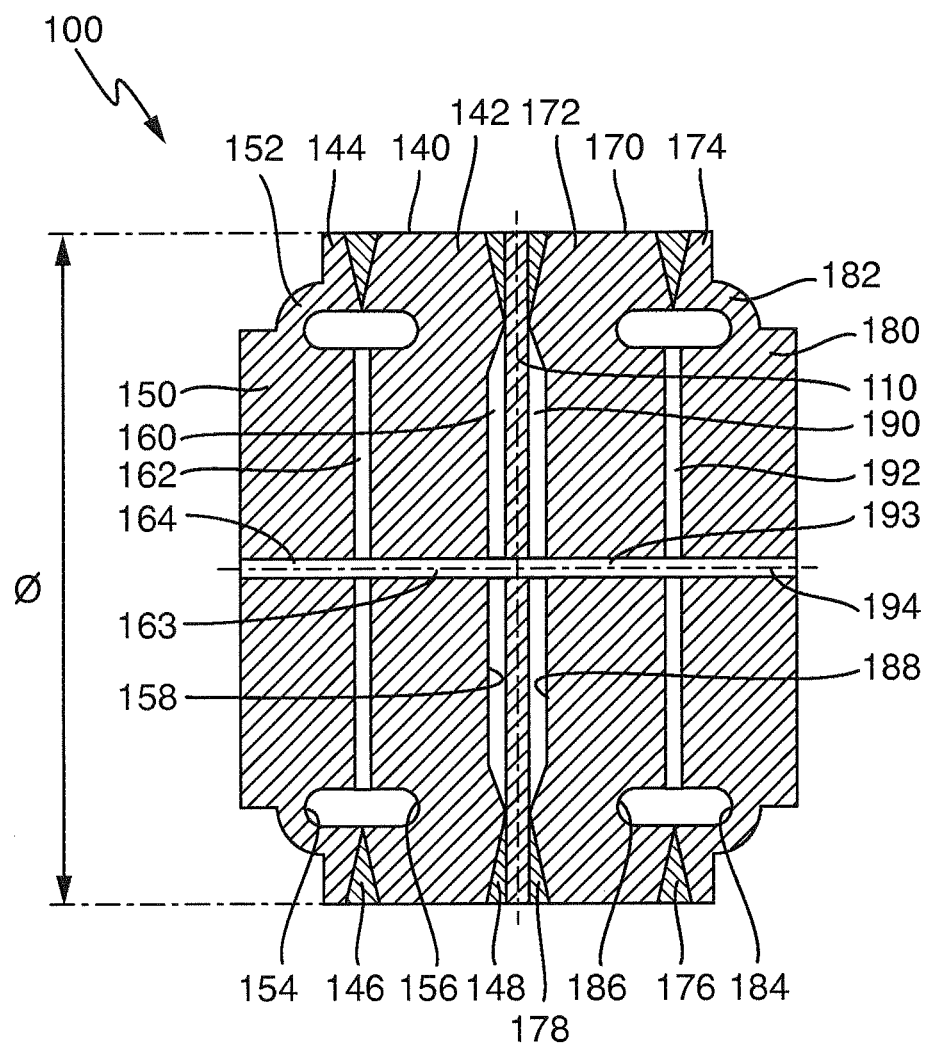
FIG. 1: is a schematic longitudinal view through an exemplary embodiment of a differential pressure measuring cell according to the invention.

The differential pressure measuring cell 100 shown in FIG. 1 comprises a measuring membrane 110 that is arranged between a first and a second, substantially—at least in sections—cylindrical opposing body 140, 170 and that is joined in a pressure-tight manner with both opposing bodies, while respectively forming a first and second measuring chamber 160, 190 along a circumferential membrane joint 148, 178. The measuring membrane and the opposing bodies feature, especially, corundum as material, wherein the membrane joint comprises an active hard solder, especially a zirconium-nickel-titanium alloy.

The differential pressure measuring cell can, for example, have a diameter of 15-50 mm, wherein diameters between 20 and 30 mm, e.g., approx. 22-26 mm, are currently considered to be advantageous. The exemplary embodiment of a differential pressure measuring cell 100 shown in the drawing has an outer diameter of 25 mm. The proportions in the drawing are, however, by no means to be considered to scale; for example, the measuring chambers 160, 190 adjoining the measuring membrane 110 have a depth of, for example, no more than 20 μm, especially no more than 15 μm, and preferably no more than 10 μm, whereas the axial dimension of the differential pressure measuring cell can, for example, be 5-20 mm.

A first measuring chamber 160 is formed between the measuring membrane 110 and the first opposing body 140, to which measuring chamber is applied a first pressure of the medium via a first pressure duct 164. Accordingly, a second measuring chamber 190 is formed between the measuring membrane 110 and the second opposing body, to which measuring chamber is applied a second pressure of the medium via a second pressure duct 194.

The differential pressure measuring cell 100 also comprises a capacitive converter that converts a deflection of the measuring membrane into an electrical signal, said deflection being dependent upon a difference in the two pressures of the medium. For this purpose, the two opposing bodies respectively have at their end surfaces on the membrane side at least one measuring electrode, wherein the measuring membrane respectively comprises a membrane electrode on both sides, which membrane electrode is oriented toward a measuring electrode. In a simple embodiment of the capacitive converter, the pressure difference to be measured results from the difference in the reciprocal values of the capacities between respectively one measuring electrode and the opposite membrane electrode. The sum of the capacity reciprocal values can be used to determine the static pressure that is superimposed by the pressure difference to be measured. In order to increase the measurement accuracy, the front sides of the opposing bodies can respectively have a circular disk-shaped central electrode and an annular electrode that surrounds the central electrode, especially an annular electrode with the same capacity. Details regarding the wiring of such a capacitive converter are known and disclosed, e.g., in EP 1 883 797 B1.

The membrane joints 148, 178 are preferably designed with a so-called "zero gap," i.e., at the inner edge of the membrane joints, the distance between the opposing bodies and the measuring membrane is zero in the ideal case. Since this can only be realized at high cost, due to the manufacturing tolerances, the term "zero gap" is to refer in this respect to a distance of no more than 5 μm, especially no more than 2 μm, and preferably no more than 1 μm. The opposing bodies 140, 170 respectively have, at their front side oriented toward the measuring membrane 110, a contour 158, 188 that approximates a bending line of the measuring membrane 110 in the case of a unilateral overload, in order to form a membrane bed, against which the measuring membrane abuts in case of such an overload in order to protect it from further deformation. The effects of the membrane beds are supported by the zero gaps, since the measuring membrane can thus be supported precisely in the edge region, where the highest stresses occur in the case of a unilateral overload. The described shape of the membrane joints 148, 178 and the contours 158, 188 at the end surfaces of the opposing bodies 140, 170 would, however, result in considerable notch stresses in the region of the membrane joints in differential pressure measuring cells according to the prior art, if a high static pressure is applied to both sides of the differential pressure measuring cell. In order to avoid this, the opposing bodies 140, 170 respectively have, according to the invention, a chamber section 142, 172 and a rear wall section 144, 174, which are connected in a pressure-tight manner by means of an opposing body joint 146, 176. The chamber sections 142, 172 are respectively oriented toward the measuring membrane 110, delimit, together with the measuring membrane 110, the measuring chambers 160, 190, and comprise, at their end surface on the membrane side, the contours 158, 188 that form the membrane bed. The chamber sections 142, 172 further respectively have an end surface on the rear side, which end surface is oriented toward a decoupling chamber 162, 192 that is formed between the chamber section 142, 172 and the rear wall section 144, 174. The decoupling chambers have a substantially circular, disk-shaped plan view and extend parallel to the measuring chambers 160, 190, wherein the diameter of the decoupling chambers 162, 192 is larger than the diameter of the measuring chambers 160, 190. An equalizing duct 163, 193 that is formed by a section of the pressure ducts 164, 194 respectively extends between the decoupling chambers 162, 192 and the measuring chambers 160, 190. Thus, the same pressure prevails in each of the decoupling chambers as in the measuring chamber connected to it. The decoupling chambers cause the respective pressure of the medium to act upon the chamber section, not only on the front side from the direction of the measuring chambers 160, 190, but also on the rear side, viz., from the direction of the decoupling chambers 162, 192. In this way, a pressure-dependent bending of the chamber sections 142, 172 is significantly reduced. Thus, the problem of the notch stresses on the membrane joints 148, 178 when a high static overload pressure is evenly applied to both measuring chambers is largely eliminated. To the extent that the chamber sections 142, 172 of the opposing bodies 140, 170 are now largely insensitive with respect to static pressures, the cross-sensitivity of the differential pressure to be measured with respect to static pressures is also reduced.

The static pressures introduced into the differential pressure measuring cell, however, act upon the rear wall sections 144, 174 of the opposing bodies 140, 170, so that the latter are elastically deformed. This is, however, less of a problem, since the position of the rear wall sections 144, 174, and, in particular, the end surfaces 150, 180 of the rear wall sections, are not directly involved in the transfer function of the capacitive converter. In addition, the opposing body joints 146, 176 can more easily be protected against notch stresses than the membrane joints 148, 178. For example, relief grooves 154, 184 lend themselves to this purpose, which relief grooves are formed annularly circumferentially in the rear wall sections 144, 174 of the opposing bodies 140, 170 from the side of the relieving chambers 162, 192. Similarly, second relief grooves 156, 186 that are formed in the chamber sections 142, 172 from the side of the relieving chambers 162, 192 can contribute to the reduction of notch stresses on the opposing body joints 146, 176. The relief grooves preferably directly adjoin the opposing body joints 146, 176.

Furthermore, there is more design freedom with the opposing body joints 146, 176 than with the membrane joints 148, 178. For example, the opposing body joints can be thicker and have a height of a few 10 μm. The radial thickness of the opposing body joints 146, 176 is, similarly to those of the membrane joints, 1-3 μm, for example. In order to relieve the opposing body joints 146, 176 further, the edge regions 152, 182 of the rear wall sections 144, 174 can be weakened by means of a reduction in material in a controlled manner, so that these edge regions have a higher flexibility. The specifically shown shapes in the drawing are by no means to be considered to scale, but are only for illustrating the principle. In particular, care must naturally be taken that, especially in the weakened edge regions 152, 182, the rupture stress of the material of the opposing bodies, in case of a deformation due to a test pressure being applied, is not reached at any point of the opposing bodies. This ultimately amounts to an optimization problem that can be solved by calculating with finite elements. For the differential pressure measuring cells in question, this means that at static pressures of, for example, 50 megapascal (500 bar) or 80 megapascal (800 bar), the mechanical stresses occurring remain below the rupture stress of corundum, such as below 500 megapascal if high-strength corundum is used, and below 400 or 350 megapascal if corundum of a lesser purity is used.

In order to detect the static pressure, at least one additional capacitive converter can be provided, which converter respectively has an electrode on the end surfaces of a chamber section 142, 172 or of a rear wall section 144, 174, said end surfaces delimiting the relieving chambers 162, 192.

Similarly, a resistive converter can be provided for detecting the static pressure, wherein the rear wall section in this case has deformation-dependent resistor elements. The latter can, for example, comprise strain gauge strips, wherein, in the case of a differential pressure measuring cell that has a semiconductor material, piezoresistive resistor elements are to be preferred.

Such an additional converter is preferably provided in both opposing bodies 140, 170, so that a static pressure can be determined for both sides of the differential pressure measuring cell. The difference in the two values for the static pressure should, in the ideal case, correspond to the measured differential pressure measurement and offers, with all deductions regarding accuracy, at least a plausibility test for the measured differential pressure measurement. Furthermore, in the case of unilateral overloads, i.e., when the measuring membrane 110 abuts against a membrane bed and thus is no longer available for the differential pressure measurement, at least an approximate value for the currently prevailing differential pressure can be output, based upon a calculated difference between the two static pressures.

The wiring of the capacitive converter is known to the person skilled in the art and need not be explained in detail here. For example, the electrodes on both sides of the measuring membrane 110 can be contacted via the membrane joints 148, 178, and can, especially, be connected to ground. Similarly, if a measurement of the respectively static pressure is intended by means of additional capacitive converters, an electrode on the end surface of the rear wall section 144, 174 can respectively be contacted via the opposing body joint 146, 176, said end surface being on the side of the decoupling chamber. The measuring electrodes for determining the differential pressure on the end surfaces of the chamber sections 142, 172 on the measuring chamber side are respectively contacted via electrical feedthroughs that are, especially, to be led radially through the respective chamber section. The same applies to the electrodes on the surfaces of the chamber sections on the decoupling chamber side, which electrodes are respectively provided for detecting a capacity dependent upon the static pressure. These electrodes are also to be contacted via feedthroughs that are, especially, led radially through the chamber section. The electrodes can, especially, comprise tantalum, oxides of tantalum, oxides of titanium, or similar metals and their oxides, wherein the electrode materials are deposited by, for example, sputtering. The feedthroughs for contacting the electrodes can, for example, comprise tantalum pins that are soldered in a pressure-tight manner into the chamber sections.

Figure 2:
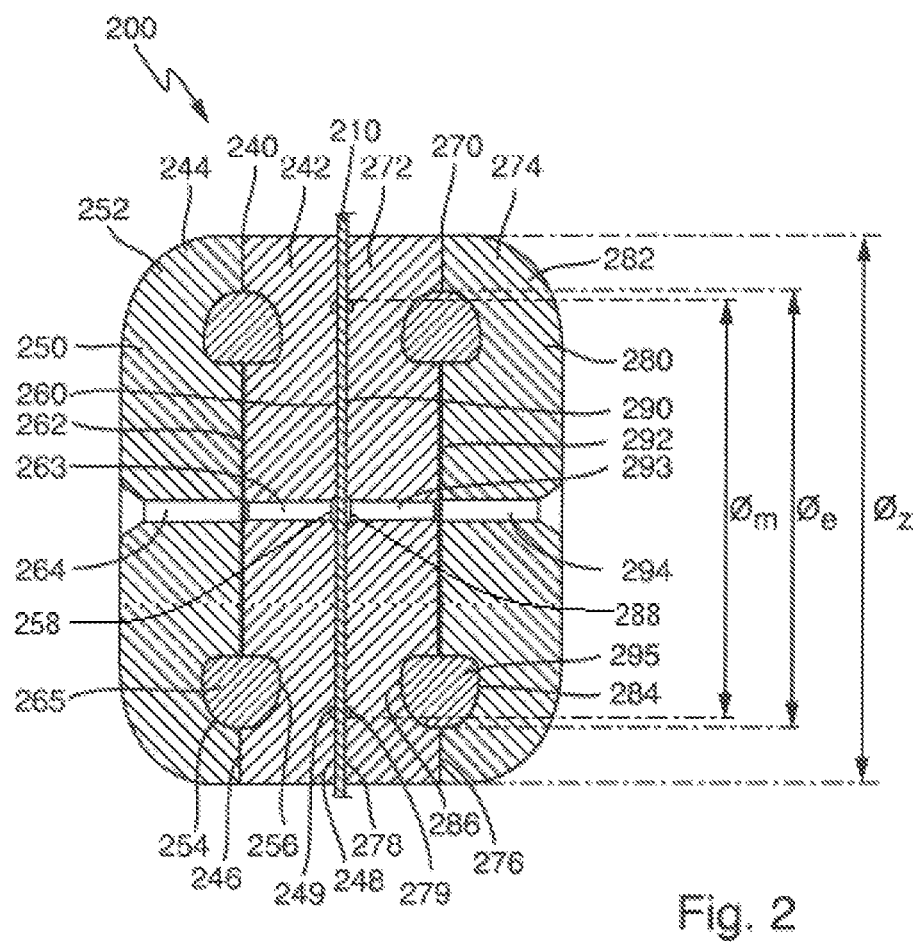
FIG. 2: is a longitudinal view through a second exemplary embodiment of a differential pressure measuring cell according to the invention.

The differential pressure measuring cell 200 shown in FIG. 2 has substantially the same design as the differential pressure measuring cell 100 of FIG. 1, so that the explanations regarding FIG. 1 accordingly apply to the exemplary embodiment of FIG. 2. FIG. 2 shows the components of the differential pressure measuring cell 200 in the specific proportions to one another, so that some structures can no longer be seen in detail. The differential pressure measuring cell 200 comprises a measuring membrane 210 that is arranged between a first and a second substantially—at least in sections—cylindrical opposing bodies 240, 270 and that is joined in a pressure-tight manner with both opposing bodies, while respectively forming a first and second measuring chamber 260, 290 along a circumferential membrane joint 248, 278. The measuring membrane and the opposing bodies feature, especially, corundum as material, wherein the membrane joint comprises an active hard solder, especially a zirconium-nickel-titanium alloy.

The differential pressure measuring cell 200 has, for example, a diameter $Ø_z$ of approx. 25 mm. The measuring chambers 260, 290 adjoining the measuring membrane 210 have a depth of, for example, no more than 15 μm, and preferably no more than 10 μm, whereas the axial dimension of the differential pressure measuring cell can, for example, be approx. 25 mm.

The first measuring chamber 260 is formed between the measuring membrane 210 and the first opposing body 240, to which measuring chamber is applied a first pressure of the medium via a first pressure duct 264. Accordingly, the second measuring chamber 290 is formed between the measuring membrane 210 and the second opposing body 270, to which measuring chamber is applied a second pressure of the medium via a second pressure duct 294.

The differential pressure measuring cell 200 also comprises a capacitive converter that converts a deflection of the measuring membrane into an electrical signal, said deflection being dependent upon a difference in the two pressures of the medium. For this purpose, the two opposing bodies respectively have at their end surfaces on the membrane side at least one measuring electrode, wherein the measuring membrane respectively comprises a membrane electrode on both sides, which membrane electrode is oriented toward a measuring electrode. The details explained in connection with FIG. 1 regarding the capacitive converter accordingly apply to this exemplary embodiment.

In this exemplary embodiment as well, the opposing bodies 240, 270 respectively have, at their front side oriented toward the measuring membrane 210, a contour 258, 288 that approximates a bending line of the measuring membrane 210 in the case of a unilateral overload, in order to form a membrane bed, against which the measuring membrane abuts in case of such an overload in order to protect it from further deformation. The effects of the membrane beds are supported by zero gaps, since the measuring membrane can thus be supported precisely in the edge region, where the highest stresses occur in the case of a unilateral overload. However, the zero gaps in this case are designed differently than in the first exemplary embodiment, since the membrane beds respectively have at their outer edge an annular circumferential membrane bed groove 249, 279 to further relieve the joints 248, 278.

In this case, a radial extrapolation of the contour of the membrane beds, which follows the curve of the bending line of the measuring membrane 210 and extends beyond the membrane bed grooves 249, 279, has, at the inner radius of the membrane joints 248, 278, approximately the zero gap distance to the measuring membrane as was described for the first exemplary embodiment. That is, the thickness of the joints at their inner radius is no more than 5 μm, especially no more than 2 μm, and preferably no more than 1 μm. The membrane bed grooves 249, 279 have a width and/or depth of, for example, no more than 0.5 mm, and especially no more than 0.3 mm.

This shape, as well, of the membrane joints 248, 278 and the contours 258, 288 at the end surfaces of the opposing bodies 240, 270 would be exposed to significant notch stresses in the region of the membrane joints in case of high static pressures, without additional protective measures. In order to avoid this, the opposing bodies 240, 270 also respectively have in this exemplary embodiment a chamber section 242, 272 and a rear wall section 244, 274, which are connected in a pressure-tight manner by means of an opposing body joint 246, 276. The chamber sections 242, 272 are respectively oriented toward the measuring membrane 210, delimit, together with the measuring membrane 210, the measuring chambers 260, 290, and comprise, on their end surface on the membrane side, the contours 258, 288 that form the membrane bed. The chamber sections 242, 272 further respectively have an end surface on the rear side, which end surface is oriented toward a decoupling chamber 262, 292 that is formed between the chamber section 242, 272 and the rear wall section 244, 274. The decoupling chambers have an axial height of a few 10 μm. They have a substantially circular, disk-shaped plan view and extend parallel to the measuring chambers 260, 290, wherein the diameter $Ø_e$ of the decoupling chambers 262, 292 is larger than the diameter $Ø_m$ of the measuring chambers 260, 290. An equalizing duct 263, 293 that is formed by a section of the pressure ducts 264, 294 respectively extends between the decoupling chambers 262, 292 and the measuring chambers 260, 290. Thus, the same pressure prevails in each of the decoupling chambers as in the measuring chamber connected to it. The decoupling chambers cause the respective pressure of the medium to act upon the chamber section, not only on the front side from the direction of the measuring chambers 260, 290, but also on the rear side, viz., from the direction of the decoupling chambers 262, 292. In this way, a pressure-dependent bending of the chamber sections 242, 272 is significantly reduced. Thus, the problem of the notch stresses on the membrane joints 248, 278, when a high static overload pressure is evenly applied to both measuring chambers, is largely eliminated. To the extent that the chamber sections 242, 272 of the opposing bodies 240, 270 are now largely insensitive with respect to static pressures, the cross-sensitivity of the differential pressure to be measured with respect to static pressures is also reduced.

As in the first exemplary embodiment, the opposing body joints 246, 276 are also protected against destructive notch stresses by first relief grooves 254, 284, which are formed annularly circumferentially in the rear wall sections 244, 274 of the opposing bodies 240, 270 from the side of the relieving chambers 262, 292, and by second relief grooves 256, 286, which are formed in the chamber sections 242, 272 from the side of the relieving chambers 262, 292. The relief grooves 256, 286 have, for example, a width and/or a depth of approx. 1.5 mm and, preferably, directly adjoin the opposing body joints 246, 276.

In the two opposing bodies 240, 270, a filling body 265, 295 that, for example, comprises Kovar is loosely placed into an annular duct formed between the first and second relief grooves 254, 256, 284, 286 in order to minimize the free volume in the differential pressure measuring cell that is to be filled during measuring operation with a transfer fluid.

Furthermore, there is more design freedom with the opposing body joints 246, 276 than with the membrane joints 248, 278. For example, the opposing body joints can be thicker and have a height of a few tens of micrometers. The radial thickness of the opposing body joints 246, 276 is, similarly to those of the membrane joints, 1-3 mm, for example. In order to relieve the opposing body joints 246, 276 further, the edge regions 252, 282 of the rear wall sections 244, 274 are rounded, so as to reduce material.

Similarly, openings of the pressure ducts 264, 294 on the rear side have conical chamfers, in order to reduce stress peaks when static pressure is applied.

In order to detect the static pressure, at least one opposing body can also have an additional capacitive or resistive converter. Preferably, both opposing bodies 240, 270 comprise such a converter, so that a static pressure can be determined for both sides of the differential pressure measuring cell. The explanations regarding the details of the converter in connection with the first exemplary embodiment accordingly apply here.

The invention claimed is:

1. A differential pressure measuring cell, comprising:
   a measuring membrane;
   a first opposing body;
   a second opposing body; and
   a converter, said converter converting a deformation of said measuring membrane, which deformation is dependent upon a difference between said first pressure and said second pressure, into an electrical signal;
   wherein:
   said measuring membrane is arranged between said first opposing body and said second opposing body and is connected in a pressure-tight manner to said two opposing bodies;
   a first measuring chamber is formed between said measuring membrane and said first opposing body; and
   a second measuring chamber is formed between said measuring membrane and said second opposing body, and
   wherein:
   said first opposing body and said second opposing body each have a pressure duct through which the first pressure or the second pressure can be applied to said respective measuring chamber;
   at least one of the opposing bodies has a chamber section oriented toward said measuring membrane and a rear wall section oriented away from said measuring membrane; a decoupling chamber is provided between said chamber section and rear wall section; said chamber section has at least one equalizing duct by means of which said measuring chamber communicates with said decoupling chamber; and said decoupling chamber has, in a plane parallel to said measuring membrane, a diameter that is at least as large as the diameter of said measuring chamber, and
   the differential pressure measuring cell further comprises:
   at least one additional electric converter for determining a static pressure, which is applied to the differential pressure measuring cell, at least based upon a pressure-dependent deformation of said rear wall section.

2. The differential pressure measuring cell according to claim 1, wherein:
   a surface of said chamber section has an annular circumferential relief groove, said surface being oriented toward said decoupling chamber.

3. The differential pressure measuring cell according to claim 1, wherein:
   a surface of said rear wall section has an annular circumferential relief groove, said surface being oriented toward said decoupling chamber.

4. The differential pressure measuring cell according to claim 1, wherein:
   the volume stroke of said decoupling chamber $\Delta V_E = V_E(p_{stat}) - V_E(p_0)$, in case of a loading of said first measuring chamber and said second measuring chamber with the same static pressure $p_{stat}$, is at least as large as the volume stroke of said measuring chamber communicating with said decoupling chamber via the equalizing duct $\Delta V_M = V_M(p_{stat}) - V_M(p_0)$, where $p_0$ is an equilibrium pressure, in case of which the same pressure prevails inside and outside the differential pressure measuring cell.

5. The differential pressure measuring cell according to claim 1, wherein:
   the volume stroke of said decoupling chamber $\Delta V_E$ is at least double, and especially not less than four times, the volume stroke of said measuring chamber communicating with said decoupling chamber via the equalizing duct $\Delta V_M$.

6. The differential pressure measuring cell according to claim 1, wherein:
   at least one of said chamber sections has a membrane bed oriented toward said measuring membrane, which membrane bed supports said measuring membrane in case of a unilateral overload pressure.

7. The differential pressure measuring cell according to claim 6, wherein:

said membrane bed has a contour that approximates a bending line of said measuring membrane at a unilateral limit pressure, so that said measuring membrane is supported by said membrane bed when this limit pressure is reached.

8. The differential pressure measuring cell according to claim 3, wherein:
   said chamber section and said rear wall section are connected to one another in a pressure-tight manner by means of a circumferential opposing body joint; and
   a maximum stress in the opposing body joint is less than a maximum stress in said rear wall section when pressure is applied to the differential pressure measuring cell.

9. The differential pressure measuring cell according to claim 8, wherein:
   the maximum stress in said rear wall section is adjacent to the relief groove;
   said relief groove has a depth of not less than 0.1 mm; and
   the location of the maximum stress in said rear wall section is spaced apart from the joint by at least half the depth of said relief groove, and preferably by at least the depth of said relief groove.

10. The differential pressure measuring cell according to claim 8, wherein:
    said measuring membrane is respectively connected to the opposing bodies along a circumferential membrane joint; and
    a maximum stress in said membrane joint is smaller than the maximum stress in said opposing body joint when the same static pressure $p_{stat}$ is applied to said first measuring chamber and said second measuring chamber.

11. The differential pressure measuring cell according to claim 1, wherein:
    said measuring membrane and/or said chamber section and/or said rear wall section feature a ceramic material, especially corundum.

12. The differential pressure measuring cell according to claim 10, wherein:
    the joints have an active hard solder, especially a Zr—Ni—Ti-containing active hard solder.

13. The differential pressure measuring cell according to claim 1, wherein:
    said additional electric converter comprises a capacitive converter that has a first electrode on one of the end surfaces of said rear wall section, which end surface is oriented toward said decoupling chamber, and a second electrode on one of the end surfaces of said chamber section, which end surface is oriented toward said decoupling chamber.

* * * * *